(12) United States Patent
Shani et al.

(10) Patent No.: US 10,073,755 B2
(45) Date of Patent: Sep. 11, 2018

(54) TRACING SOURCE CODE FOR END USER MONITORING

(71) Applicant: HEWLETT-PACKARD DEVELOPMENT COMPANY, L.P., Houston, TX (US)

(72) Inventors: Inbar Shani, Yehud (IL); Gil Perel, Yehud (IL); Guy Offer, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 133 days.

(21) Appl. No.: 14/905,313

(22) PCT Filed: Sep. 30, 2013

(86) PCT No.: PCT/US2013/062695
§ 371 (c)(1),
(2) Date: Jan. 15, 2016

(87) PCT Pub. No.: WO2015/047409
PCT Pub. Date: Apr. 2, 2015

(65) Prior Publication Data
US 2016/0210215 A1  Jul. 21, 2016

(51) Int. Cl.
*G06F 11/34* (2006.01)
*G06F 11/36* (2006.01)

(52) U.S. Cl.
CPC ...... *G06F 11/3414* (2013.01); *G06F 11/3466* (2013.01); *G06F 11/3476* (2013.01);
(Continued)

(58) Field of Classification Search
CPC ............ G06F 11/3414; G06F 11/3466; G06F 11/3495; G06F 11/3636
(Continued)

(56) References Cited

U.S. PATENT DOCUMENTS 7,437,614 B2    10/2008  Haswell et al.
7,506,047 B2 *  3/2009   Wiles, Jr. ............ G06F 11/3414
                                          707/999.001
(Continued)

FOREIGN PATENT DOCUMENTS

CN           101551836           10/2009

OTHER PUBLICATIONS

Hirschauer, J., Tag | End User Monitoring, Feb. 4, 2013, 3 pages, <http://www.appdynamics.com/blog/tag/end-user-monitoring/>.
(Continued)

*Primary Examiner* — Joseph R Kudirka (57) ABSTRACT

Example embodiments relate to tracing source code for end user monitoring. In example embodiments, an application is monitored to obtain an interaction log, where the interaction log tracks application interactions by each of a plurality of synthetic monitors. Further, an execution of application code that is associated with the application is monitored to obtain an instrumentation log. At this stage, the interaction log and the instrumentation log are used to determine relationships between portions of the application code and the plurality of synthetic monitors. A notification of a modification to the application is received, and an affected subset of the synthetic monitors that are affected by the modification are identified based on the relationships.

12 Claims, 4 Drawing Sheets

(52) U.S. Cl.
CPC ...... *G06F 11/3495* (2013.01); *G06F 11/3636* (2013.01); *G06F 11/3433* (2013.01); *G06F 11/3438* (2013.01); *G06F 2201/865* (2013.01); *G06F 2201/87* (2013.01)

(58) Field of Classification Search
USPC .............................. 714/35, 37, 38.1, 45, 47.1
See application file for complete search history.

(56) References Cited

U.S. PATENT DOCUMENTS

| | | | |
|---|---|---|---|
| 7,624,176 B2* | 11/2009 | Dickerson | ............... H04L 67/20 707/999.1 |
| 8,468,502 B2 | 6/2013 | Lue et al. | |
| 2005/0223366 A1 | 10/2005 | Smith et al. | |
| 2006/0277439 A1 | 12/2006 | Davis | |
| 2007/0266149 A1 | 11/2007 | Cobb et al. | |
| 2010/0287541 A1 | 11/2010 | Saunders et al. | |
| 2010/0332473 A1 | 12/2010 | Brodsky et al. | |
| 2011/0161395 A1* | 6/2011 | O'Donnell, III | .... G06F 11/3414 709/203 |
| 2012/0023487 A1 | 1/2012 | Letca et al. | |
| 2012/0066378 A1 | 3/2012 | Lui et al. | |
| 2012/0174120 A1 | 7/2012 | Malkiman et al. | |
| 2012/0222014 A1 | 8/2012 | Pardesia et al. | |

OTHER PUBLICATIONS

International Search Report and Written Opinion, PCT Patent Application No. PCT/US2013/062695, dated Jun. 20, 2014, 10 pages.
Unknown, Alertfox End-user Monitor, 2013, 2 pages, <https://www.whatsupgold.com/web-monitoring/>.
Unknown, VMware vFabric™ Hyperic, 2013, 4 pages, <http://www.vmware.com/products/application-platform/vfabric-hyperic.html>.

* cited by examiner

TRACING SOURCE CODE FOR END USER MONITORING

CROSS-REFERENCE TO RELATED APLICATION

This application is a U.S. National Stage Application of and claims priority to International Patent Application NO. PCT/US2013/062695, file on Sep. 30, 2013, and entitled "TRACING SOURCE CODE FOR END USER MONITORING".

BACKGROUND

Development and Operations (DevOps) is an emerging set of practices and methodologies aimed at bridging the gaps between developers and operations in modern information technology (IT) and software organizations. DevOps practices include automation of the delivery process, cross-functional teams that include developers and operations, alignment of development environments and production environment, etc. One such gap is the disconnection between code changes and production synthetic monitors. Synthetic monitors are scripts or flows executed from an end-user perspective in a production environment, where the monitors alert IT personnel when the user experience is degraded.

BRIEF DESCRIPTION OF THE DRAWINGS

The following detailed description references the drawings, wherein.

DETAILED DESCRIPTION

As discussed above, DevOps practices attempt to bridge the gap between code changes and production synthetic monitors. Typically, manual maintenance is applied to ensure that the scripts are continuing to execute and are still monitoring the correct process when the application is changed. For example, this is a process similar to scripts that interacts with the monitored application user interface (UI) or application programming interface (API) (e.g., test scripts). Further, updating EUM scripts when an application changes can offer additional challenges for IT and software organizations that adopt DevOps practices such as Continuous Delivery, which release application changes more frequently, and that rely on more automation and less manual interventions.

Example embodiments disclosed herein trace source code for EUM using static and dynamic code analyses. For example, in some embodiments, an application is monitored to obtain an interaction log, where the interaction log tracks application interactions by each of a plurality of synthetic monitors. Further, an execution of application code that is associated with the application is monitored to obtain an instrumentation log. At this stage, the interaction log and the instrumentation log are used to determine relationships between portions of the application code and the plurality of synthetic monitors. A notification of a modification to the application is received, and an affected subset of the synthetic monitors that are affected by the modification are identified based on the relationships.

In this manner, example embodiments disclosed herein allow application changes to be related to EUM by performing various static and dynamic code analyses. Specifically, by observing instrumentation on the server-side and monitoring on the client-side, relationships between application code and synthetic monitors may be identified.

Figure 1:
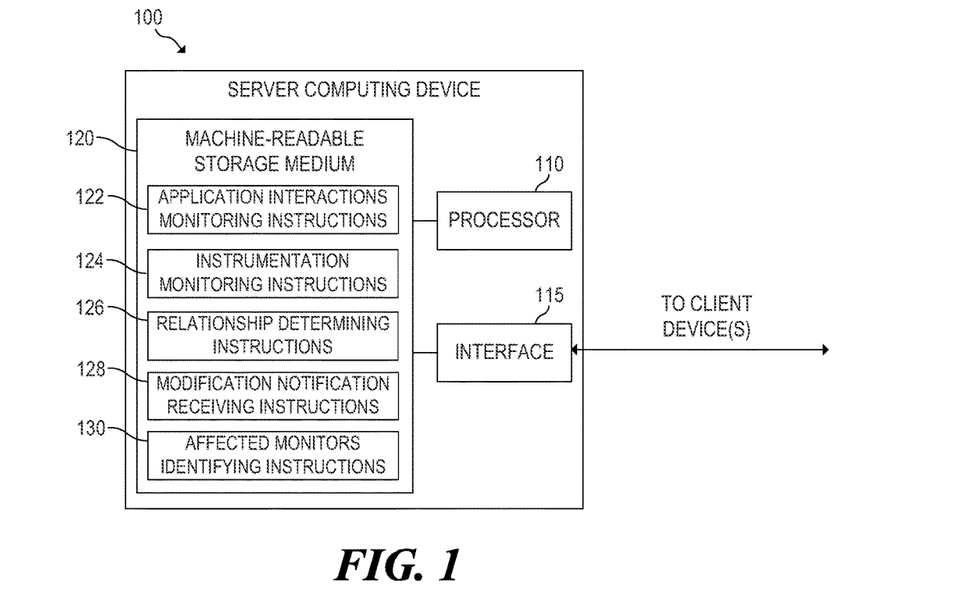
FIG. 1 is a block diagram of an example system for tracing source code for end user monitoring (EUM)

Referring now to the drawings, FIG. 1 is a block diagram of an example system for tracing source code for EUM. The example system can be implemented as a computing device 100 such as a server, a notebook computer, a desktop computer, an all-in-one system, a tablet computing device, or any other electronic device suitable for tracing source code for EUM. In the embodiment of FIG. 1, computing device 100 includes a processor 110, an interface 115, and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126, 128, 130 to enable tracing source code for EUM. As an alternative or in addition to retrieving and executing instructions, processor 110 may include one or more electronic circuits comprising a number of electronic components for performing the functionality of one or more of instructions 122, 124, 126, 128, 130.

Interface 115 may include a number of electronic components for communicating with client device(s). For example, interface 115 may be an Ethernet interface, a Universal Serial Bus (USB) interface, an IEEE 1394 (FireWire) interface, an external Serial Advanced Technology Attachment (eSATA) interface, or any other physical connection interface suitable for communication with a client device. Alternatively, interlace 115 may be a wireless interface, such as a wireless local area network (WLAN) interface or a near-field communication (NFC) interface. In operation, as detailed below, interface 115 may be used to send and receive data, such as application data, to and from a corresponding interface of a client device.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for tracing source code for EUM.

Application interactions monitoring instructions 122 may monitor interactions of synthetic monitors with an executing application. For example, synthetic monitors may interact with user interface elements of an application, where user inputs and application responses can be logged. In another example, synthetic monitors may interact with data entry points of an application, where input parameters and return values can be logged. The interactions with the application may be stored in an interactions log for later use as described below.

Examples of data entry points of the application may include, but are not limited to, uniform resource locator (URL) parameters, hypertext markup language (HTML) parameters, client-side scripting parameters, web service interfaces, and API's. In some cases, the data entry points may be identified based on key words in the source code, where the key words vary according to the programming language of the source code. In other cases, the data entry points may be identified based on metadata in, for example, an extensible markup language (XML) message that describes the expected parameters and output.

An application may be software or a service provided by computing device 100 to client devices over a network (e.g., Internet, Intranet, etc.) via the interface 115. For example, an application may be executed by a web server executing on computing device 100 to provide web pages to a web browser of a client device. In another example, an application may be a web service that provides functionality in response to requests from a client device over a network.

Instrumentation monitoring instructions 124 may perform server-side monitoring of the execution of the application. Specifically, the execution of portions of code and the triggers of the execution may be logged in an instrumentation log. For example, time stamps and corresponding function names may be logged during invocation of functions in the application. In this example, interactions from client devices may also be logged so that comparisons can be made between the instrumentation log and the interactions log. The instrumentation log may be created by a dynamic analysis module that has access to, for example, debugging functionality and/or programming interfaces of the executing application as well as system information (e.g., memory stack, event logs, etc.) of computing device 100. Client-side may refer to any operation executing on a client device interacting with the computing device 100. Server-side may refer to any operation executing on computing device 100.

Relationship determining instructions 126 may identify relationships between portions of application code and synthetic monitors. For example, matching interactions with the application by the synthetic monitors may be identified in both the interactions log and the instrumentation log to identify an invoking synthetic monitor and a related portion of application code that is executed in response to the invocation. The relationship between a synthetic monitor and a portion of application code may also be ranked based on the probability that the synthetic monitor will be affected by a change to the application code.

Modification notification receiving instructions 128 may process notifications of application changes. Changes in an application include, but are not limited to, modifications to source code, modifications to a configuration of computing device 100, changes to the deployment of the application, etc. For example, a source configuration management (SCM) system may be configured to notify modification notification receiving instructions 128 of source code changes.

Affected monitors identifying instructions 130 may identify monitors that are affected by a change to the application. Specifically, the relationships identified above may be used to identify a portion of source code that is related to the application change, where the portion of source code is then used to identify the affected monitors. In some cases, the relationships identified above may be used to create a look-up table, which is used to identify the affected monitors.

Figure 2:
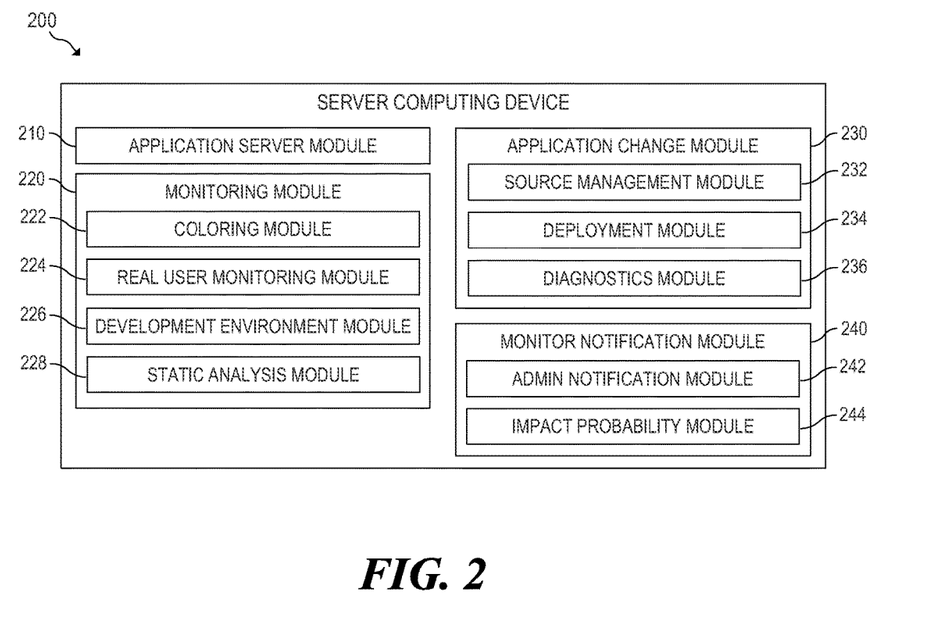
FIG. 2 is a block diagram of an example computing device including modules or performing aspects of tracing source code for EUM.

FIG. 2 is a block diagram of an example computing device 200 including modules for performing aspects of tracing source code for EUM. As with computing device 100 of FIG. 1, computing device 200 may be any electronic device suitable for tracing source code for EUM.

Application server module 210 may be a server software application configured to provide an application to client devices. The application may be provided as thin or thick client software, web pages, or web services over a network. The application server module 210 may provide the application based on source code (e.g., HTML files, script files, etc.) or object code (e.g., linked libraries, shared objects, executable files, etc.) generated from source code. For example, the application server module 210 may provide web pages based on HTML files, which may include embedded scripts that are executed by the application server module 210 to generate dynamic content for the client devices. In another example, the application server module 210 may expose an interface to a web service that triggers execution of a function in a linked library in response to receiving a request from a client device.

As illustrated in FIG. 2 and described in detail below, computing device 200 may also include a number of modules 220-244. Each of the modules may include a series of instructions encoded on a machine-readable storage medium and executable by a processor of computing device 200. In addition or as an alternative, each module 220-244 may include one or more hardware devices comprising electronic circuitry for implementing the functionality described below. In some cases, the modules 220-244 may be implemented as a distributed system across multiple computing devices.

Monitoring module 220 may monitor the execution of an application provided by the web server module 210. Although the components of monitoring module 220 are described in detail below, additional details regarding an example implementation of monitoring module 220 are provided above with respect to instructions 122, 124, and 126 of FIG. 1.

Coloring module 222 tags transactions executed by synthetic monitoring with colors and links the transactions to code executed by application server module 210. In some cases, coloring module 222 may also tag transactions executed by synthetic monitoring on client devices. Coloring module 222 integrates with instrumentation monitoring tools and records information about which portions of application code are executed when a synthetic monitor is executed.

Real user monitoring module 224 associates real user monitoring (RUM) and deep code diagnostics with synthetic monitors. RUM traces the actual execution of real users in production by, for example, duplicating network traffic of the monitored application. RUM can be further enhanced with code diagnostics to link the code execution with the user transactions. For example, RUM can be used to link code executed by the monitored application to transaction signatures (e.g., an API call and arguments), which are further linked to synthetic monitors using a record of calls by the synthetic monitors to the server. In this example, RUM serves as the man-in-the-middle for linking synthetic monitors and application code traced by deep code diagnostics. In this case, RUM is especially helpful in a network architecture where mediators (e.g., a load balancer) can interfere with the synthetic monitor coloring.

Development environment module 226 automatically performs synthetic monitoring scripts in test environments that are in isolation and have full code diagnostics enabled. The result of synthetic monitoring scripts is a benchmark linkage between the synthetic monitors and the executed code.

Static analysis module 228 may use static analysis techniques to detect application API and UI elements in source code that are interacted with by the synthetic monitoring scripts. The static analysis may be used to establish a link between the API and UI elements and the synthetic monitors. Source code may be a collection of human-readable, computer instructions. Examples of source code files include, but are not limited to, HTML files, configurations files, dynamic script files, and various programming language files.

Application change module 230 may monitor an application provided by application server module 210 for changes. Although the components of application change module 230 are described in detail below, additional details regarding an example implementation of application change module 230 are provided above with respect to instructions 128 of FIG. 1.

Source management module 232 may interact with an SCM system to monitor source code of an application for changes. For example, the SCM system may notify source management module 232 when changes are made to a source code file, In this example, the notification may include information describing the source code changes such as a portion (e.g., lines of code) of the source code file that is affected, API's available to client devices in the portion of the source code, etc.

Deployment module 234 may interact with deployment tools to identify changes in the deployments of the application. For example, the deployment tools may notify deployment module 234 of new or changed artifacts that the deployment tools have deployed. Deployment tools may include automated installation systems, system imaging managers, storage partition managers, etc. Artifacts may include software modules such as web services, database systems, applications, etc.

Diagnostics module 236 may interact with infrastructure monitors and diagnostics to detect new or changed artifacts. Infrastructure monitors may monitor computing devices (e.g., servers, client devices, etc.) on a network to obtain performance, configuration, access, and fault information. For example, an infrastructure monitor may detect faults on a server and then identify likely causes of the fault on the network. In another example, an infrastructure monitor may monitor network data to ensure service level agreements are satisfied.

Monitor notification module 240 may manage notifications to administrators of the synthetic monitors. Although the components of monitor notification module 240 are described in detail below, additional details regarding an example implementation of monitor notification module 240 are provided above with respect to instructions 130 of FIG. 1.

Admin notification module 242 may send notifications to administrators of synthetic monitors that are determined to be related to an application change. The related synthetic monitors may be determined using identified relationships and other output provided by the monitoring module 220 as described above. For example, in response to the application change module 230 detecting an application change, a look-up table describing potential relationships between portions of application code and synthetic monitors may be consulted to identify related synthetic monitors.

Impact probability module 244 may rank related synthetic monitors based on probabilities that an application change affects each of the synthetic monitors. Specifically, impact probability module 244 may use the results of the various analysis performed by monitoring module 220 to determine accuracy probabilities for identified relationships between portions of application code and synthetic monitors. For example, relationships identified by coloring module 222 and development environment module 226 may be considered more direct and, accordingly, have a relatively higher accuracy probability. Admin notification module 242 may rank related synthetic monitors in the notification described above based on the accuracy probabilities of the associated relationships.

Figure 3:
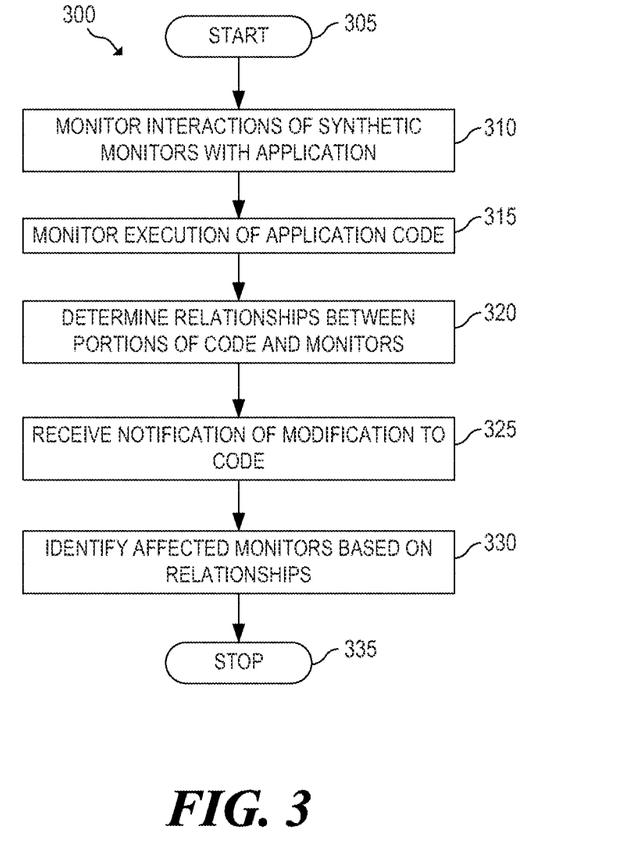
FIG. 3 is a flowchart of an example method for execution by a computing device for tracing source code for EUM.

FIG. 3 is a flowchart of an example method 300 for execution by a computing device 100 for tracing source code for EUM. Although execution of method 300 is described below with reference to computing device 100 of FIG. 1, other suitable devices for execution of method 300 may be used, such as computing device 200 of FIG. 2. Method 300 may be implemented in the form of executable instructions stored on a machine-readable storage medium, such as storage medium 120, and/or in the form of electronic circuitry.

Method 300 may start in block 305 and continue to block 310, where computing device 100 monitors interactions by synthetic monitors with an application. Specifically, static code analysis and network monitoring may be performed on the application to log how executions of the synthetic monitors interact (e.g., API, user interface elements of the application, etc.) with the application. Next, in block 315, computing device 100 monitors the execution of the application. For example, dynamic code analysis may be performed to log portions of application code that are executed in response to interactions from the synthetic monitors.

In block 320, computing device 100 determines relationships between the portions of application code and the synthetic monitors. Specifically, the interactions with the application may be matched between the logs created above in block 310 to 315 to relate synthetic monitor calls and the resulting executions in the application code. In block 325, a notification of a modification to application code is received. For example, an SCM system may detect the modification and provide the notification. In block 330, computing device 100 identifies synthetic monitors that are affected by the modification based on the relationships identified above. At this stage, the administrators of the affected monitors may be notified so that the synthetic monitors can be appropriately reconfigured. Method 300 may subsequently proceed to block 335, where method 300 may stop.

Figure 4:
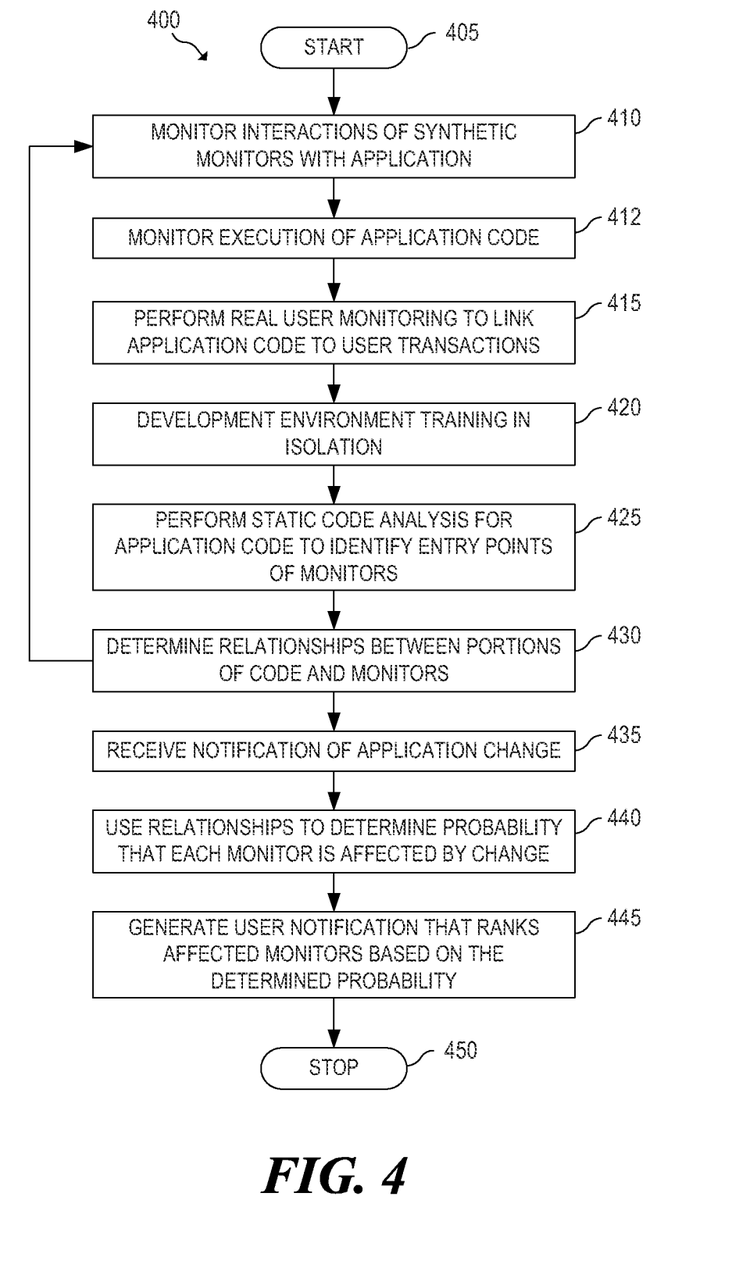
FIG. 4 is a flowchart of an example method for execution by a computing device for tracing source code for EUM using static and dynamic code analyses.

FIG. 4 is a flowchart of an example method 400 for execution by a computing device 200 for tracing source code for EUM using static and dynamic code analyses. Although execution of method 400 is described below with reference to computing device 200 of FIG. 2, other suitable devices for execution of method 400 may be used, such as computing device 100 of FIG. 1. Method 400 may be implemented in the form of executable instructions stored on a machine-readable storage medium and/or in the form of electronic circuitry.

Method 400 may start in block 405 and proceed to block 410, where computing device 200 monitors interactions by synthetic monitors with an application, In block 412, the execution of application code associated with the application is monitored. In block 415, computing device 200 performs real user monitoring to link portions of application code to user transaction signatures (e.g., API calls, etc.). In block 420, development environment training is performed in isolation to identify portions of application code that are executed in response to training scripts. In block 425, static code analysis is performed to identify data entry points that are accessible to synthetic monitors.

In block 430, computing device 200 determines relationships between portions of application code and synthetic monitors based on the data collected in blocks 410-425. At this stage, method 400 may return to block 410 so that data collection may continue and so that additional relationships may be continuously identified in block 430 as the application executes. For example, monitor data may be collected so that relationships can be identified in block 430 periodically (e.g., hourly, daily, weekly, etc.).

In block 435, notification of an application change may be received. The application change may be related to source code and/or the configuration of the deployment of the application. In block 440, the relationships determined in block 430 are used to determine the probability that each synthetic monitor is affected by the application change. In block 445, a user notification that ranks any affected monitors based on the determined probabilities is generated. For example, all synthetic monitors with a probability exceeding a preconfigured threshold may be identified and included in the user notification. At this stage, the user notification can be provided to the administrators of the affected synthetic monitors. Method 400 may subsequently proceed to block 450, where method 400 may stop.

Figure 5A:
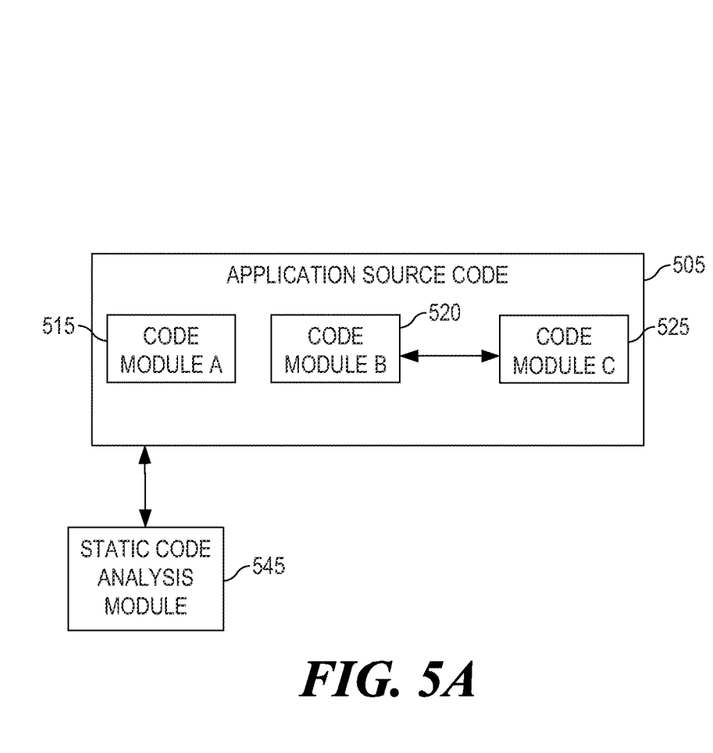
FIGS. 5A-5B are block diagrams of example application code at various stages of tracing source code for EUM.
Figure 5B:
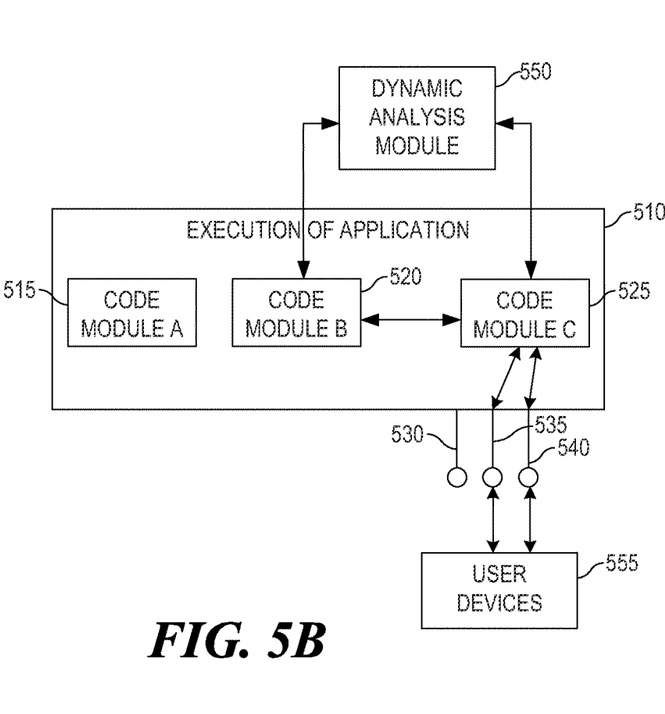

FIGS. 5A-5B are block diagrams of example application code at various stages of tracing source code for EUM. FIG. 6A depicts source code 505 of an application, where the source code 505 includes code module A 515, code module B 520, and code module C 525. Code module B 520 is shown to interact with code module C 525. For example, code module B 520 may invoke code module C 525, which then returns output back to code module B 520. Static code analysis module 545 may analyze application source code 505 to identify data entry points (e.g., API) that can be used by synthetic monitors.

FIG. 5B depicts execution of the application 510, where the execution 510 includes code module A 515, code module B 520, and code module C 525. Execution 510 also shows the data entry points 530, 535, 540 that are exposed when the application is in production. The data entry points 530, 535, 540 are accessible to user devices 555, which may include synthetic monitors. As the data entry points 530, 535, 540 are accessed, dynamic analysis module 550 may monitor the execution of the application 550 to identify portions of the application that are executed in response to the data entry points 530, 535, 540 being accessed.

The foregoing disclosure describes a number of example embodiments for tracing source code for EUM using static and dynamic code analyses. In this manner, the embodiments disclosed herein enable more relationships between portions of application code and synthetic monitors to be identified by observing instrumentation on the server-side and monitoring on the client-side.

We claim:

1. A system for tracing source code for end user monitoring, the system comprising:
a processor to:
monitor an application to obtain an interaction log, wherein the interaction log tracks application interactions by each of a plurality of synthetic monitors;
monitor an execution of application code that is associated with the application to obtain an instrumentation log;
use the interaction log and the instrumentation log to determine a plurality of relationships between portions of the application code and the plurality of synthetic monitors, wherein to determine the plurality of relationships comprises:
perform synthetic monitoring scripts in a test environment of the application to link the synthetic monitoring scripts to the portions of the application code, wherein the plurality of relationships are determined based on the synthetic monitoring scripts;
determine data entry points of the application in the interaction log, wherein the plurality of synthetic monitors interact with the application at the data entry points;
determine, from the instrumentation log, a corresponding portion of the application code executed for each of the data entry points; and
determine, for each of the data entry points, a synthetic monitor of the plurality of synthetic monitors interacting with the data entry point;
receive a notification of a modification of a portion of the application code from a source management module; and
identify an affected synthetic monitor of the plurality of synthetic monitors that is affected by the modification based on at least one of the data entry points corresponding to the modified portion of the application code.

2. The system of claim 1, wherein the processor is further to:
perform static code analysis of the application code to identify application programming interfaces (API's) accessed by the plurality of synthetic monitors, wherein the plurality of relationships are further determined based on the API's.

3. The system of claim 1, wherein a reachable portion of code comprises a first portion of code that is reachable from a client-side operation and a second portion of code that is not reachable from the client-side operation, and wherein the processor is further to:
perform real user monitoring to link execution of the portions of the application code to user transaction signatures, wherein the user transaction signatures are associated with interface calls that are linked to the plurality of synthetic monitors.

4. The system of claim 1, wherein the affected monitors are ranked according to a probability that each of the affected monitors is affected by the modification in the application code.

5. The system of claim 1, wherein the processor is further to:
receive a deployment notification of a change in a deployment configuration of the application; and
identify a second subset of the synthetic monitors that are affected by the change in the deployment configuration based on the plurality of relationships.

6. A method, implemented at least in part by a computing device, for tracing source code for end user monitoring, the method comprising:
monitoring an application to obtain an interaction log, wherein the interaction log tracks application interactions by each of a plurality of synthetic monitors;
monitoring an execution of application code that is associated with the application to obtain an instrumentation log;
using the interaction log and the instrumentation log to determine a plurality of relationships between portions of the application code and the plurality of synthetic monitors, wherein to determine the plurality of relationships comprises:
performing synthetic monitoring scripts in a test environment of the application to link the synthetic monitoring scripts to the portions of the application code, wherein the plurality of relationships are determined based on the synthetic monitoring scripts;
determining data entry points of the application in the interaction log, wherein the plurality of synthetic monitors interact with the application at the data entry points;
determining, from the instrumentation log, a corresponding portion of the application code executed for each of the data entry points; and
determining, for each of the data entry points, a synthetic monitor of the plurality of synthetic monitors interacting with the data entry point;
receiving a notification of a modification of a portion of the application; and
identifying an affected synthetic monitor of the plurality of synthetic monitors that is affected by the modification based on at least one of the data entry points corresponding to the modified portion of the application code.

7. The method of claim 6, further comprising:
performing static code analysis of the application code to identify application programming interfaces (API's) accessed by the plurality of synthetic monitors, wherein the plurality of relationships are further determined based on the API's.

8. The method of claim 7, wherein a reachable portion of code comprises a first portion of code that is reachable from a client-side operation and a second portion of code that is not reachable from the client-side operation, and wherein the method further comprises:
performing real user monitoring to link execution of the portions of the application code to user transaction signatures, wherein the user transaction signatures are associated with interface calls that are linked to the plurality of synthetic monitors.

9. The method of claim 6, wherein the affected monitors are ranked according to a probability that each of the affected monitors is affected by the modification in the application code.

10. A non-transitory machine-readable storage medium encoded with instructions executable by a processor for tracing source code for end user monitoring, the machine-readable storage medium comprising instructions to:
monitor an application to obtain an interaction log, wherein the interaction log tracks application interactions by each of a plurality of synthetic monitors;
monitor an execution of application code that is associated with the application to obtain an instrumentation log;
use the interaction log and the instrumentation log to determine a plurality of relationships between portions of the application code and the plurality of synthetic monitors, wherein to determine the plurality of relationships comprises:
perform synthetic monitoring scripts in a test environment of the application to link the synthetic monitoring scripts to the portions of the application code, wherein the plurality of relationships are determined based on the synthetic monitoring scripts;
determine data entry points of the application in the interaction log, wherein the plurality of synthetic monitors interact with the application at the data entry points;
determine, from the instrumentation log, a corresponding portion of the application code executed for each of the data entry points; and
determine, for each of the data entry points, a synthetic monitor of the plurality of synthetic monitors interacting with the data entry point;
receive a notification of a modification of a portion of the application code from a source management module; and
identify affected synthetic monitors of the plurality of synthetic monitors that is affected by the modification based on at least one of the data entry points corresponding to the modified portion of the application code, wherein the affected synthetic monitors are ranked according to a probability that each of the affected synthetic monitors is affected by the modification in the application code.

11. The non-transitory machine-readable storage medium of claim 10, wherein the instructions are further to:
perform static code analysis of the application code to identify application programming interfaces (API's) accessed by the plurality of synthetic monitors, wherein the plurality of relationships are further determined based on the API's.

12. The non-transitory machine-readable storage medium of claim 10, wherein a reachable portion of code comprises a first portion of code that is reachable from a client-side operation and a second portion of code that is not reachable from the client-side operation, and wherein the instructions are further to:
perform real user monitoring to link execution of the portions of the application code to user transaction signatures, wherein the user transaction signatures are associated with interface calls that are linked to the plurality of synthetic monitors.

* * * * *